(12) United States Patent
Keskes (10) Patent No.: US 9,442,206 B2
(45) Date of Patent: Sep. 13, 2016

(54) METHOD AND DEVICE TO PROCESS A THREE DIMENSIONAL SEISMIC IMAGE

(71) Applicant: TOTAL SA, Courbevoie (FR)

(72) Inventor: Noomane Keskes, Abu Dhabi (AE)

(73) Assignee: Total SA, Courbevoie (FR)

( * ) Notice: Subject to any disclaimer, the term of this patent is extended or adjusted under 35 U.S.C. 154(b) by 0 days.

(21) Appl. No.: 14/441,754

(22) PCT Filed: Nov. 7, 2013

(86) PCT No.: PCT/IB2013/002626
§ 371 (c)(1),
(2) Date: May 8, 2015

(87) PCT Pub. No.: WO2014/083402
PCT Pub. Date: Jun. 5, 2014

(65) Prior Publication Data
US 2015/0285934 A1    Oct. 8, 2015

(30) Foreign Application Priority Data
Nov. 8, 2012   (EP) .................................... 12306380

(51) Int. Cl.
| G06K 9/00 | (2006.01) |
| G01V 1/34 | (2006.01) |
| G01V 1/30 | (2006.01) |
| G06T 17/05 | (2011.01) |

(52) U.S. Cl.
CPC ............. *G01V 1/345* (2013.01); *G01V 1/302* (2013.01); *G01V 1/303* (2013.01); *G01V 1/306* (2013.01); *G06T 17/05* (2013.01); *G01V 2210/642* (2013.01); *G01V 2210/74* (2013.01)

(58) Field of Classification Search
None
See application file for complete search history.

(56) References Cited

U.S. PATENT DOCUMENTS

| 8,743,115 | B1* | 6/2014 | Mallet | G01V 1/302 345/419 |
| 2005/0086006 | A1* | 4/2005 | Favret | G06K 9/6203 702/14 |
| 2012/0026833 | A1* | 2/2012 | Soubaras | G01V 1/282 367/50 |
| 2013/0064040 | A1* | 3/2013 | Imhof | G01V 1/30 367/73 |
| 2015/0199845 | A1* | 7/2015 | Zinck | G01V 1/30 382/109 |

OTHER PUBLICATIONS

PCT International Search Report and Written Opinion for PCT/IB2013/002626, mailed Oct. 8, 2014, 13 pgs.

(Continued)

*Primary Examiner* — Bhavesh Mehta
*Assistant Examiner* — Oneal R Mistry
(74) *Attorney, Agent, or Firm* — Patterson Thuente Pedersen, P.A.

(57) ABSTRACT

The present invention relates to a method to process a three dimensional seismic image. The method comprises, for a center point and for a plane comprising said center point, determining a first maximal correlation between a first vector of the seismic values associated with at least a point of the seismic image having a distance to the center point below the predetermined distance and on a first line, and a second vector of the seismic values associated with points on a second line parallel to the first line, determining a second maximal correlation between the first vector, and a third vector of the seismic values associated with points on a third line parallel to the first line, and determining a difference value based on at least a difference between the first maximal correlation and the second maximal correlation.

13 Claims, 7 Drawing Sheets

(56) References Cited

OTHER PUBLICATIONS

Angélique Berthelot et al: "Salt diapirs without well defined boundaries—a feasibility study of semi-automatic detection", Geophysical Prospecting, vol. 59, No. 4, Apr. 4, 2011, pp. 682-696, XP055139646, ISSN: 0016-8025, DOI: 10.1111/j.1365-2478.2011.00950.x.

Marfurt K J et al: "3-D seismic attributes using a semblance-based coherency algorithm", Geophysics, Society of Exploration Geophysicists, US, vol. 63, No. 4, Jul. 1, 1998, pp. 1150-1165, XP002195379, ISSN: 0016-8033, DOI: 10.1190/1.1444415.

Gersztenkorn A et al: "Eigenstucture-based coherence computations as an aid to 3-D structural and stratigraphic mapping", Geophysics, Society of Exploration Geophysicists, US, vol. 64, No. 5, Sep. 1, 1999, pp. 1468-1479, XP002483245, ISSN: 0016-8033, DOI: 10.1190/1.1444651.

Cohen I et al: "Detection and Extraction of Fault Surfaces in 3D Seismic Data", Geophysics, Society of Exploration Geophysicists. US, vol. 71, No. 4, Jul. 1, 2006, pp. P21-P27, XP001245371.

\* cited by examiner

METHOD AND DEVICE TO PROCESS A THREE DIMENSIONAL SEISMIC IMAGE

RELATED APPLICATIONS

The present application is a National Phase entry of PCT Application No. PCT/IB2013/002626, filed Nov. 7, 2013, which claims priority to EP Patent Application No. 12306380.2, filed Nov. 8, 2012, said applications being hereby incorporated by reference herein in their entirety.

BACKGROUND OF THE INVENTION

The present invention relates to the domain of processing seismic images and especially to the domain of geological fault identification in these seismic images.

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section. Furthermore, all embodiments are not necessarily intended to solve all or even any of the problems brought forward in this section.

When analyzing seismic images, it may be very important do identify faults and geo-bodies to characterize the subsoil. Indeed, exploration and development teams are facing increasing challenges to find and produce hydrocarbon fields.

At the different stages of seismic interpretation, the introduction and combination of seismic attributes are keys to better understand structural and sedimentary features.

The geology derived by seismic attributes must be accurate. Uncertainties related to fault networks, geobodies mapping and their interfaces may have significant impact on prospect definition as well as on field development plans.

In order to detect faults, it is possible use classical edge detection method. It is for instance possible to receive an input seismic model and, for each mesh cell, determining the correlation value (or a mean value) with the eight closest mesh cells (in 2D).

Nevertheless, such methods have drawbacks. Indeed, edge detection method does not fully take into account the 3D information that a seismic image may have: very subtle variation may thus be ignored while they may be highly valuable for exploration and development teams.

If many methods may have been developed, they only provide coarse results and only identify obvious faults.

In addition, most of these methods detect faults based on the maximum or the minimum value of the computed results (for instance, dark lines may represent the faults if the result of the computation is represented with grey color value, 255 being the white color, 0 being the black color). Nevertheless it may be very difficult to detect subtle variations in faults as the human eye does not easily identify variation in an image that is below 10% of the value of the pixels nearby.

Thus, there is a need for detecting subtle lineaments that are not seen, or that are difficult to detect with conventional attribute maps and therefore for improving and for simplifying:
 fault network and geobodies definition,
 identification of flow barriers encountered,
 identification of relay zones,
 reducing uncertainties on fault sealing capacity and communication between panels,
 field development plan, well design and geo-steering.

SUMMARY OF THE INVENTION

The invention relates to a method to process a three dimensional seismic image, the seismic image comprising points, each point comprising an associated seismic value, wherein the method comprises:
 /a/ receiving the three dimensional seismic image;
 /b/ receiving a predetermined distance;
 For a center point in the points of the seismic image and for a plane comprising said center point, said plane defining a first connected set of points, a second connected set of points, and the method further comprises:
  /c/ determining a first maximal correlation between:
   a first vector of the seismic values associated with at least a point of the seismic image having a distance to the center point below the predetermined distance and on a first line, said plane comprising said first line, and
   a second vector of the seismic values associated with points on a second line parallel to the first line, the second vector being shifted by a plurality of shifting distances;
  /d/ determining a second maximal correlation between:
   the first vector, and
   a third vector of the seismic values associated with points on a third line parallel to the first line, the third vector being shifted by a plurality of shifting distances;
  /e/ determining a difference value based on at least a difference between the first maximal correlation and the second maximal correlation.

The points of the first connected set are points of the seismic image having a distance to the center point below the predetermined distance, the points of the first connected set being on a first side of the plane and the points of the second connected set are points of the seismic image having a distance to the center point below the predetermined distance, the points of the second connected set being on a second side of the plane distinct from the first side.

A "distance" may be understood as the mathematical notion of distance.

The "plurality of shifting distances" may be distances that are drawn in a set of distance values (e.g. {1,2,3,4,5}) or may be distances that are drawn in an interval (e.g. [1;10]). This latter interval may be defined thanks to a maximum value M (e.g. 5): in such case, the interval may be an interval such as ]0;M].

The center point may be any of the point of the seismic image.

When reciting that "a first point is on a side of a plane and a second point is an other side of the plane", one may understand that
 the first point is a point of the seismic image for which the distance to the plane is greater or equal than 0 and, if $\vec{n}$ is a vector normal to the plane, the scalar product of $\vec{n}$ with a vector defined by a point of the plane and the first point is greater or equal than 0 (respectively lower or equal than 0).
 the second point is a point of the seismic image for which the distance to the plane is greater or equal than 0 and the scalar product of $\vec{n}$ with a vector defined by a point of the plane and the second point is lower or equal than 0 (respectively greater or equal than 0).

It is also possible to understand that:
the first point is a point of the seismic image for which the distance to the plane is greater or equal than 0 and, if $\vec{n}$ is a vector normal to the plane, the scalar product of $\vec{n}$ with a vector defined by a point of the plane and the first point is greater than 0 (respectively lower or equal than 0).
the second point is a point of the seismic image for which the distance to the plane is greater than 0 and the scalar product of $\vec{n}$ with a vector defined by a point of the plane and the second point is lower than 0 (respectively greater than 0).

For instance, the first line may be vertical (parallel to the axis $\vec{z}$). Thus, vectors may represent vertical alignments of pixels of the seismic image, these alignments being shift along axis $\vec{z}$).

The proposed method does not provide a result as an absolute value to detect faults (i.e. fault being represented as maximum or the minimum value. Instead the provided result (i.e. "the difference value") eases the detection of fault: the method provides the result as a difference (i.e. as an approximation of a derivate) which is much easier to interpret for human eye.

In a possible embodiment, step /c/ and /d/ may be reiterated for a plurality of distinct second and third vector and the determination of step /e/ may be based on the difference between sum of the first maximal correlations determined and a sum of the second maximal correlations determined.

For the center point in the points of the seismic image, step /c/ and /d/ may be reiterated for a plurality of different planes comprising said center point.

For instance, the projection of the planes on the plane (x,y) may be lines that divide such plane (x,y) with the angle (0°,45°); (45°,90°); (90°,135°); (135°,180°).

For the center point in the points of the seismic image, step /c/ and /d/ may be reiterated for at least four distinct planes comprising said center point and a shared line, each plane in the four planes may be perpendicular to a different plane in the four planes.

Step /c/, /d/ and /e/ may be reiterated for a plurality of distinct center points.

In another possible embodiment, the method may further comprise:
/f/ determining a representation of the seismic image, wherein a representation color for a current point in the plurality of center points is based on the value of the determined difference associated with said current point.

The method may also further comprise:
/f/ determining a representation of the seismic image, wherein each different plane is associated with a different color scale, a representation color of a determined difference is based on a color scale associated with the plane for which the difference is determined and the value of said determined difference associated with said current point.

Points of the plane may be excluded from points of the first connected set and/or the second connected set.

The second vector and/or the third vector may be shifted by a plurality of shifting distances into a predetermined shifting interval.

The first line may comprise the center point.

The first line may comprise an orthogonal projection point of a point of the second line on the plane.

A second aspect of the invention is related to a device to process a three dimensional seismic image, the seismic image comprising points, each point comprising an associated seismic value.

The device comprises:
/a/ an interface for receiving the three dimensional seismic image;
/b/ an interface for receiving a predetermined distance;

For a center point in the points of the seismic image and for a plane comprising said center point, said plane defining a first connected set of points, a second connected set of points, the device further comprises:
/c/ a circuit for determining a first maximal correlation between:
  a first vector of the seismic values associated with points of the seismic image having a distance to the center point below the predetermined distance and on a first line, said plane comprising said first line, and
  a second vector of the seismic values associated with points on a second line parallel to the first line, the second vector being shifted by a plurality of shifting distances into an predetermined shifting interval;
/d/ a circuit for determining a second maximal correlation between:
  the first vector, and
  a third vector of the seismic values associated with points on a third line parallel to the first line, the third vector being shifted by a plurality of shifting distances;
/e/ a circuit for determining a difference value based on at least a difference between the first maximal correlation and the second maximal correlation;

The points of the first connected set are the points of the seismic image having a distance to the center point below the predetermined distance, the points of the first connected set being on a first side of the plane and the points of the second connected set are the points of the seismic image having a distance to the center point below the predetermined distance, the points of the second connected set being on a second side of the plane distinct from the first side.

A third aspect relates to a computer program product comprising a computer readable medium, having thereon a computer program comprising program instructions. The computer program is loadable into a data-processing unit and adapted to cause the data-processing unit to carry out the method described above when the computer program is run by the data-processing unit.

Other features and advantages of the method and apparatus disclosed herein will become apparent from the following description of non-limiting embodiments, with reference to the appended drawings.

BRIEF DESCRIPTION OF THE DRAWINGS

The present invention is illustrated by way of example, and not by way of limitation, in the figures of the accompanying drawings, in which like reference numerals refer to similar elements and in which.

DETAILED DESCRIPTION OF THE DRAWINGS

Figure 1:
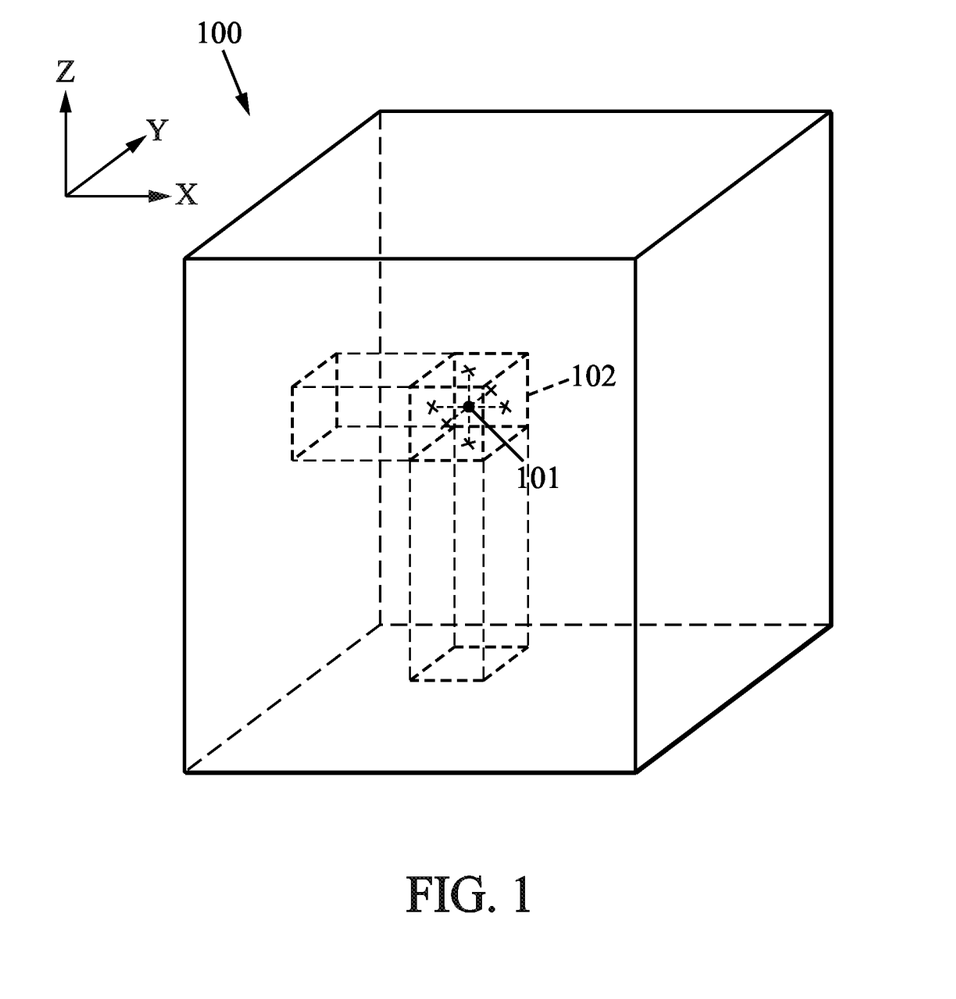
FIG. 1 is a representation of a three dimensional seismic image.

FIG. 1 is a representation of a three dimensional seismic image.

A three dimensional seismic image 100 is a set of points, each point having coordinates in a space domain (for instance, in the space domain defined by the orthonormal vectors ($\vec{x}, \vec{y}, \vec{z}$)) and each point being associated with a seismic value (for instance, a reflection parameter).

The points may be "randomly" spread in the entire seismic image but, most of the time, the points are represented with pixels that form a regular mesh, the size of each pixel being uniform and each pixel is a cube (in 3D or a square in 2D): in this case, the "point" may correspond to the middle of the cube or to any corner (for instance).

For any point 101 of the seismic image (that is called hereafter a center point), it is possible to define neighbor points 102: the distance between any neighbor point and the center point is below a predetermined value (for instance set by an operator).

The distance may be a mathematical distance. For instance, if the coordinates of the center point are $(x_1, y_1, z_1)$ and the coordinates of a neighbor point are $(x_2, y_2, z_2)$, the distance may be:
- an Euclidean distance (i.e. $d=\sqrt{(x_1-x_2)^2+(y_1-y_2)^2+(z_1-z_2)^2}$), the neighbor points forming a sphere;
- a Manhattan distance (i.e. $d=|x_1-x_2|+|y_1-y_2|+|z_1-z_2|$),
- a "cube" distance (i.e. $d=\max(|x_1-x_2|, |y_1-y_2|, |z_1-z_2|)$), the neighbor points forming a cube;
- a "rectangle" distance (i.e. $d=\max(|x_1-x_2|, p|y_1-y_2|, q|z_1-z_2|)$), the neighbor points forming a rectangle whose shape is defined by the parameter p and q;
- any other mathematical distance.

The neighbor points 102 form a cube in the representation of FIG. 1.

It is possible to define neighbor points for any point of the seismic image. If a center point is "too close" to the edge of the seismic image, it is possible to define additional "virtual" points outside the seismic image that have a seismic value equal to 0 (or any other value, such as the mean of the seismic values in the image) in order to be able to determine a complete set 102 of neighbor points.

Figure 2A:
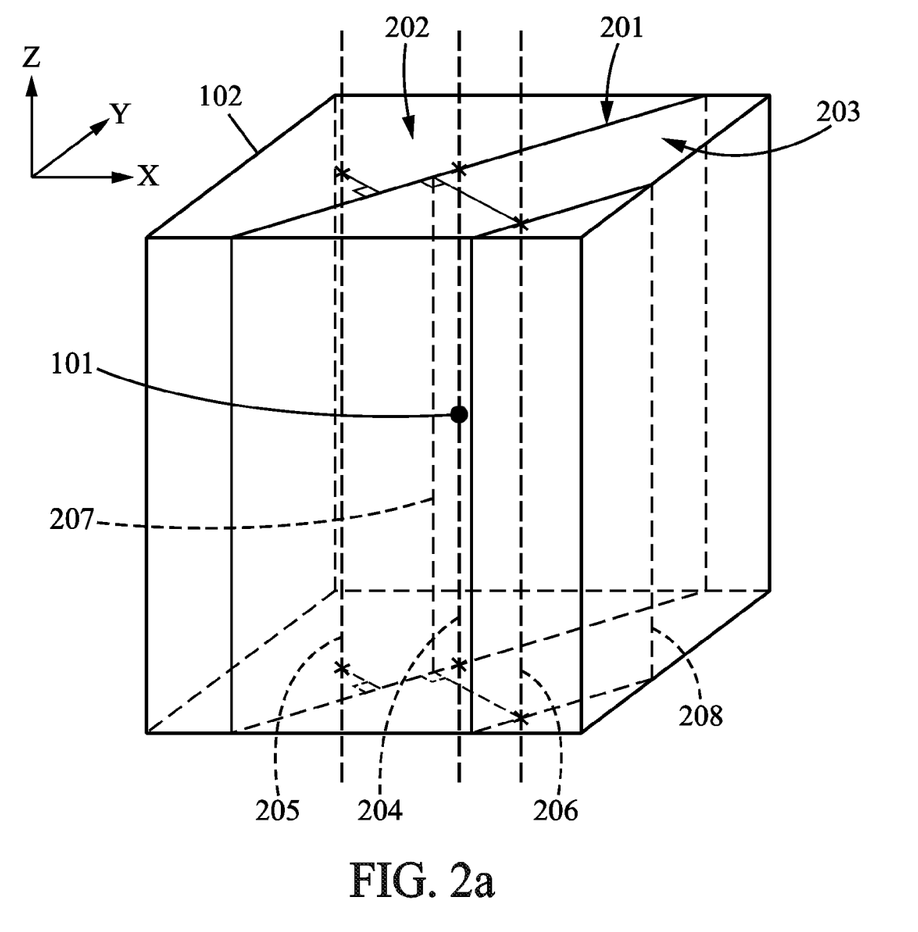
FIG. 2a is a representation of points of a seismic image for which the distance to a center point is below a predetermined distance.

FIG. 2a is a representation of points of a seismic image for which the distance to a center point is below a predetermined distance. Points of a seismic image, for which the distance to a center point is below a predetermined distance, is called "neighbor points of the center point".

In FIG. 2a, the center point is represented by point 101 and the set of neighbor points is represented by the cube 102.

The predetermined distance may be correlated with a determined noise in the seismic image.

It is possible to define a plane 201 that intersects the cube 102 and contains the center point 101. This plane may have any orientation but it may be useful that this plane 201 is vertical (i.e. contains the axis $\vec{z}$): indeed, as it is noted below, in case of a regular mesh image (pixel image) the pixels is aligned according at least the axis $\vec{z}$. The plane may also comprise the axis $\vec{x}$ or $\vec{y}$ or any bisector of the angle in the plan ($\vec{x}, \vec{y}$).

This plane 201 divides the cube 102 in two parts:
- a first connected set of points 202 on a first side of the plane;
- a second connected set of points 203 on the other side of the plane.

To simplify the process, points of the plan may be excluded from the two connected set (in order to avoid any double "membership"). It is also possible to decide that the points of the plan belong to the first connected set and/or to the second connected set.

It is also possible to define a first line 204 in the plane 201. This line is in the direction of the axis $\vec{z}$ in this embodiment but may be chosen in any direction. It may be useful that this line is chosen according to the main direction of supposedly geological faults: as most of the faults are often vertical (or noticeably vertical), it may be relevant to choose a vertical direction for this line 204.

Some points of this line (for instance, successive points) and in the cube 202 may define a first vector of points associated with seismic values. If the points are not uniformly spread on the line or if the number of points is insufficient, it is possible to interpolate seismic values along the line 204 and then it is possible to sample the values with a given distance between two successive points.

Once this first line identified, it is possible to determine one (or more) second line 205, parallel to the first line 204 and comprising at least one point in the first connected set of points 202. It is also possible to determine one (or more) third line 206, parallel to the first line 204 and comprising at least one point in the second connected set of points 203.

Some points of the second and third line (for instance N successive points) may respectively define a second and third vector of points of seismic values. If the points are not uniformly spread on the line or if the number are points is insufficient or if the distance between points is not identical to the distance between two points/samples in the first vector, it is possible to interpolate seismic values all over the line 205 and/or 206 and then to create new points by sampling the values with the given distance between two points.

The second and third vectors may have a length equal to the length of the first vector.

Figure 2B:
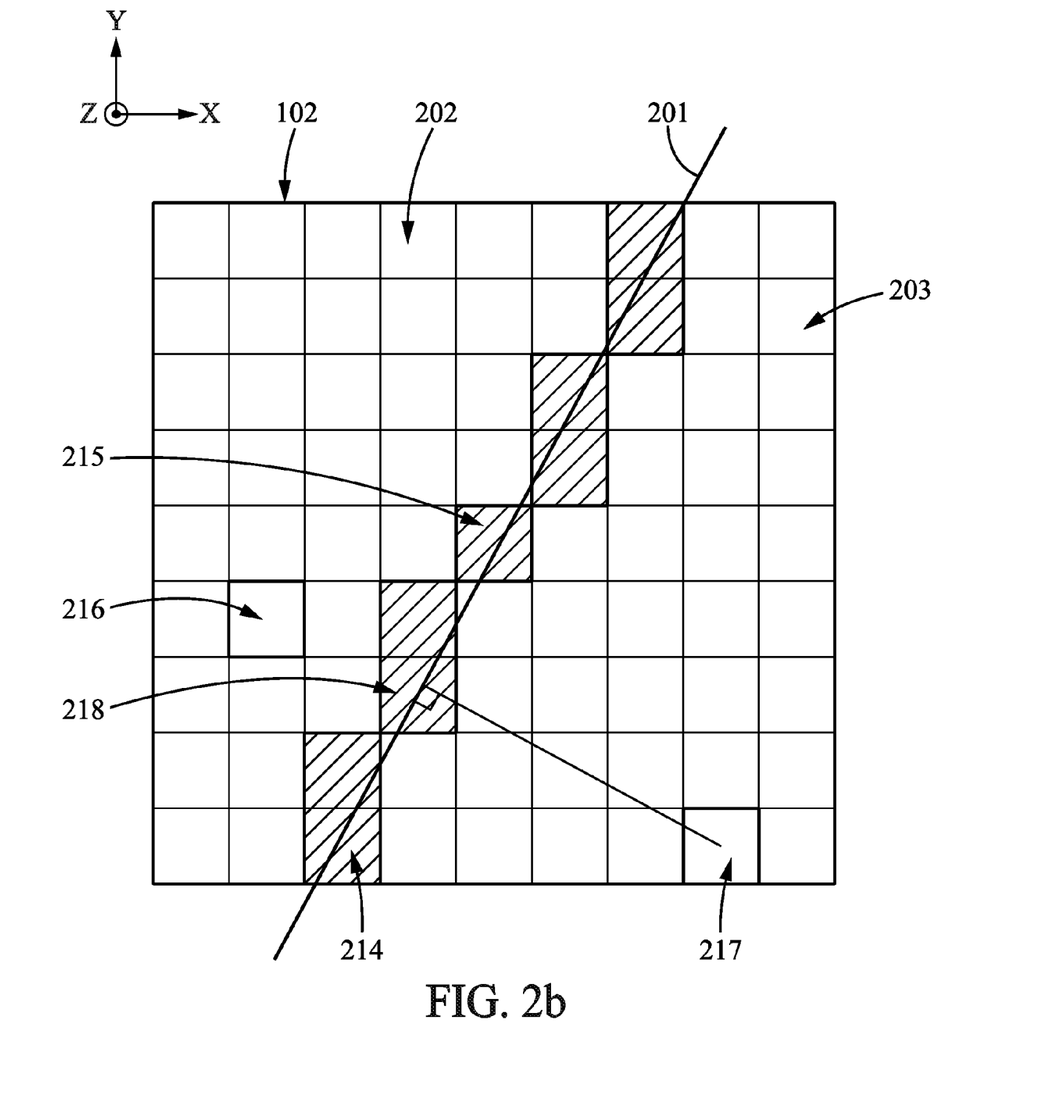
FIG. 2b is a representation of points of a seismic image for which the distance to a center point is below a predetermined distance in a meshed/pixel seismic image.
Figure 2C:
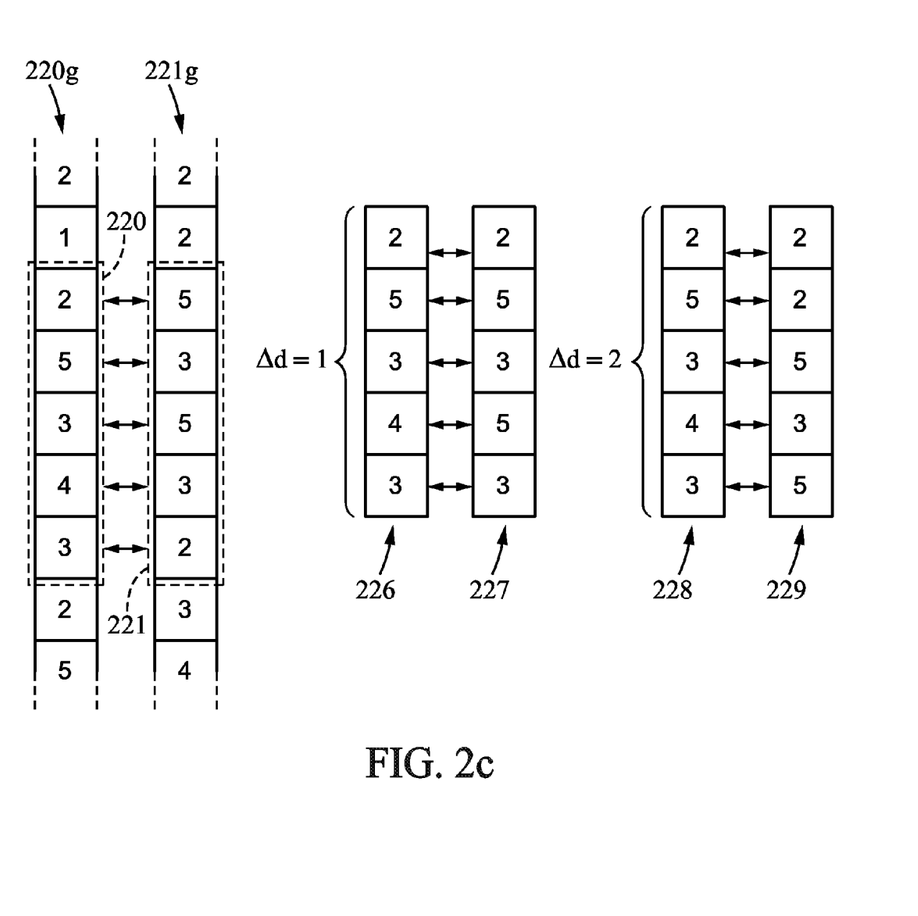
FIG. 2c is representation of the-computation of maximal correlation value by shifting a vector.

If the points of the first vector are points of the cube 102, the points of the second and/or third vector may be:
- either points of the cube 102
- or (and especially when the second or third vector is shifted, see description related to FIG. 2c), points outside the cube.

In addition, for each determined second or third line, it is possible to define respectively a second or third plane 208 that comprises respectively the second or the third line and is parallel to the first plane.

FIG. 2b is a representation of points of a seismic image for which the distance to a center point is below a predetermined distance in a meshed/pixel seismic image.

FIG. 2b may represent the cube 102 from a top view (i.e. the view being parallel to the axis $-\vec{z}$). The cube 102 is a cube filled with 9×9×$N_z$ pixels in this specific embodiment ($N_z$ being the number of pixel in the $\vec{z}$ direction).

Points are then represented with pixels.

"Points of a plane" are thus represented with pixels that approximate the plane: the hatched pixels 214 are points on the plane 201 (all pixels of the cube with same x-coordinate and y-coordinate than these points are also "point of the plane 201).

The "first connected set of points" 202 is represented by pixels on one side of the plane 201 such as pixel 216.

The "second connected set of points" 203 is represented by pixels on the other side of the plane 201 such as pixel 217.

Pixel 215 corresponds to the top pixel of a vector that comprises the center point. Indeed, in this embodiment, the first line is parallel to the axis $\vec{z}$ and comprises the center point (and thus the vector comprises pixels with same (x,y)-coordinates than element 215).

Pixel 218 may correspond to the orthogonal projection of pixel 217 on the plane 201. Thus pixels with the same (x,y)-coordinates as pixel 218 are the projection of the pixels with the same (x,y)-coordinates as pixel 217.

FIG. 2c is representation of the computation of maximal correlation value by shifting a vector.

Element 221g is a set of pixels/points corresponding to the points of line 206 in FIG. 2a. Element 221 is a set of pixels/points corresponding to the points of line 206 in FIG. 2a and that have coordinates in the cube 102.

In a first embodiment (and preferred embodiment), element 220g is a set of pixels/points corresponding to the points of line 204 in FIG. 2a (and thus comprising the center point 101). Element 220 is a set of pixels/points corresponding to the points of line 204 in FIG. 2a and in the cube 102.

In a second embodiment, element 220g may be instead a set of pixels/points corresponding to the points of line 207 in FIG. 2a (orthogonal projection of the points of line 206 on the first plane 201). Element 220 is then a set of pixels/points corresponding to the points of line 207 in FIG. 2a and that have coordinates in the cube 102. In this embodiment, it is possible that no point is explicitly defined in the seismic image at the coordinates of the projection: thus, it is either possible to use the nearest defined point as the projected point or to interpolate the value of the projected point based on an interpolation algorithm and the value of closest points.

In the following, the computation of the maximum correlation is detailed between vector 220 (either defined according the first or second embodiment) and vector 221.

If a vector X has N elements $x_i$ (with i=1 ... N) and a vector Y has N elements $y_i$ (with i=1 ... N), the correlation value may be provided by the following formula:

$$\text{corr}(X, Y) = \frac{\sum_{i=1}^{N}(x_i - \bar{x})(y_i - \bar{y})}{\sqrt{\sum_{i=1}^{N}(x_i - \bar{x})^2}\sqrt{\sum_{i=1}^{N}(y_i - \bar{y})^2}}$$

At that stage, no vector is shifted (i.e. the vectors are shifted by a shifting distance $\Delta d:=0$).

Shifting a vector may comprise a translation of the values of the vector (and the value of the initial set of values) by a shifting distance as it is described below.

The shifting distances are algebraic measures. In this embodiment, the distance is expressed as a number of pixels (positive or negative).

During a shifting, the vectors remain at their respective positions: only the values of set 221g are translated in the vector. Thus, vector 226 and vector 228 are identical to vector 220. Vector 227 is a vector with five elements but the initial value is translated by $\Delta d=1$:

- the second element "5" of vector 227 is the first element of vector 221;
- the third element "3" of vector 227 is the second element of vector 221;
- the fourth element "5" of vector 227 is the third element of vector 221;
- the fifth element "3" of vector 227 is the fourth element of vector 221.

The fifth element of vector 221 is not maintained in vector 227. The first element of vector 227 is the element in the set 221g above the first element of the vector 221.

Thus, the correlation value may be computed with vectors 226 and 227.

If the shifting distance is $\Delta d=2$, same reasoning may be developed with vectors 228 and 229.

The shifting distance may be framed by a maximum distance value and/or a minimum distance value (e.g $\Delta d \in [M,N]$ or $\Delta d \in [M,N]$ with M,N real numbers). The possible value $\Delta d$ may be a function of the shifting distance used for close second vectors (below a predetermined distance) to maximize the correlation with the first vector: for instance, if the value of $\Delta d$ used to maximize the nearest second vector is $D_1$ (respectively is in the interval $[D_2, D_3]$), the value of $\Delta d$ may be for the current second vector in $[D_1-d_m; D_1+d_m]$ (respectively is in the interval $[D_2-d_m, D_3+d_m]$).

The maximal correlation value may be the maximal correlation between two vectors (a first vector and a second vector), the second vector being shifted by a plurality of shifting distances (eventually into a predetermined shifting interval). In either case 1 or case 2, a correlation value may be computed for all possible shifting distance $\Delta d$ (or for a subset of possible distance $\Delta d$) for each couple of vectors. Then, the maximal correlation value may be determined for each couple of vectors by selecting the maximum in the computed correlation values for this couple.

In a possible embodiment, it is possible add an additional constraint to determine the maximum correlation. As detailed in FIG. 2a, it is possible to determine a plurality of lines 206 parallel to line 204 in a plane 208 parallel to plane 201. To determine the "maximum correlation" between the first vector and the second vector on line 206, it is possible to:

- for each possible value $\Delta d$, sum the correlation values between the first vector and every possible vector parallel to the first vector and on plane 208;
- determine the value of $\Delta d$ that maximize the computed sum (i.e. $\Delta d_{max}$);
- determine the correlation value of the first vector and the second vector on line 206 for a shifting distance equal to $\Delta d_{max}$.

This embodiment allows translating the vectors of a plane parallel to the first plane 201 by a same shifting distance $\Delta d_{max}$.

Figure 3:
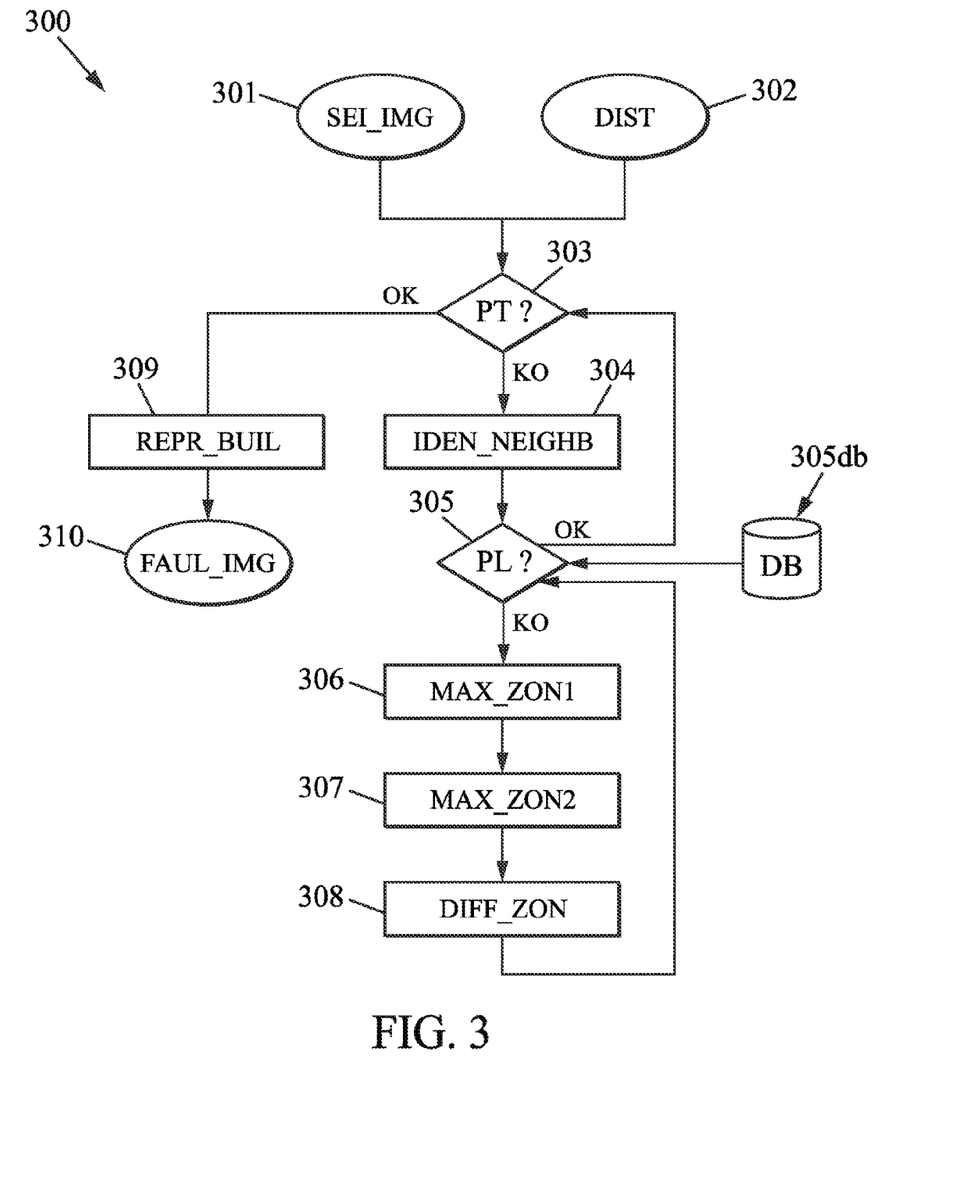
FIG. 3 is a flow chart describing an embodiment of the present invention.

FIG. 3 is a flow chart 300 describing an embodiment of the present invention. Part of this flow chart can represent steps of an example of a computer program which may be executed by the device of FIG. 5.

When receiving a three dimensional seismic image 301 and a predetermined distance 302, it is possible to process pixels/points of this image as described below.

If a point of the image has not been processed (test 303, output KO), this point is selected (and referred in the following as the center point). Neighbor points of this center point are then identified (step 304): a neighbor point is a point of the seismic image for which the distance between this point and the center point is below the received predetermined distance 302 (see description related to FIG. 1).

In addition, one or a plurality of plane may be used for the following processing. Characteristics of the plane(s) may be, for instance, store in a database 305db. Such characteristics may comprise the orientation of the plane(s) (for instance, a first plane may comprise the axis $\vec{z}$ and $\vec{x}$; a second plane may comprise the axis $\vec{z}$ and $\vec{y}$; a third plane may comprise the axis $\vec{z}$ and a first bisector of $(\vec{x},\vec{y})$; a fourth plane may comprise the axis $\vec{z}$ and a second bisector of $(\vec{x},\vec{y})$).

If a plane has not been used for a processing of the selected pixel (test 305, output KO), this plane is selected.

Once a plane is selected, it is possible to compute (step 306) for each possible line parallel to a first line (aligned with axis $(\vec{z})$) in the plane and having an intersection with the first connected set (see FIG. 2a for the definition) a first maximal correlation value as detailed in relation with the FIG. 2c. The computation of the maximal correlation uses a first and a second vector:
- the second vector corresponds to points on the possible line parallel to the first line;
- the first vector may comprise:
  (i) either points of the first line and in the neighbor points (preferred embodiment),
  (ii) or points corresponding to (i.e. identical to these points or close/related to them) the projection of points of the possible line on the selected plane.

In the case (i), the second vectors are compared with a single vector (comprising the center point) for the computation of the sum of the maximal correlation values.

In the case (ii), the second vectors are compared with a one or more first vectors, each first vectors being parallel and in the selected plane.

In the case (i), all first maximal correlations may be summed:

$$SM_1 = \sum_{(x,y) \in Z1} \max_{\Delta d \in D}(\text{corr}(X, Y_{x,y}(\Delta d)))$$

with Z1 a set of coordinates of points in the first connected set, X the first vector comprising points of the selected plane (for instance, the center point), $Y_{(x,y)}$ the second vector comprising points with coordinates (x,y), $\Delta d$ being a shifting distance of the vector $Y_{(x,y)}$, D being a set or an interval of possible values for $\Delta d$.

Same computations may be performed in the second connected set and a second maximal correlation may be computed (step 307) for each possible line parallel to the first line of the plane and having an intersection with the second connected set. All second maximal correlations may be summed:

$$SM_2 = \sum_{(x,y) \in Z2} \max_{\Delta d \in D}(\text{corr}(X, U_{x,y}(\Delta d)))$$

with Z2 a set of coordinates of points in the second connected set, $U_{(x,y)}$ the third vector comprising points with coordinates (x,y), $\Delta d$ being a shifting distance of the vector $U_{(x,y)}$.

Note that the cardinal number of the set Z1 and Z2 is identical or very similar. If this is not the case, it is possible to divide each sum with their associated cardinal, i.e.:

$$SM_1 = \sum_{(x,y) \in Z1} \frac{\max_{\Delta d \in D}(\text{corr}(X, Y_{x,y}(\Delta d)))}{\text{card}(Z1)}$$

$$SM_2 = \sum_{(x,y) \in Z2} \frac{\max_{\Delta d \in D}(\text{corr}(X, U_{x,y}(\Delta d)))}{\text{card}(Z2)}$$

In the case (ii), the formulas are slightly different as the first vector $X_Y$ or $X_U$ is function of the coordinates of the second vector (see above):

$$SM_1 = \sum_{(x,y) \in Z1} \max_{\Delta d \in D}(\text{corr}(X_Y, Y_{x,y}(\Delta d)))$$

$$SM_2 = \sum_{(x,y) \in Z2} \max_{\Delta d \in D}(\text{corr}(X_U, U_{x,y}(\Delta d))) \text{ or}$$

$$SM_1 = \sum_{(x,y) \in Z1} \frac{\max_{\Delta d \in D}(\text{corr}(X_Y, Y_{x,y}(\Delta d)))}{\text{card}(Z1)}$$

$$SM_2 = \sum_{(x,y) \in Z2} \frac{\max_{\Delta d \in D}(\text{corr}(X_U, U_{x,y}(\Delta d)))}{\text{card}(Z2)}$$

Once $SM_1$ and $SM_2$ are computed, it is possible to determine a difference (step 308) associated with the center point:

Diff=$SM_1$-$SM_2$

If all plane has been used for a processing (test 305, output KO), it is possible to change the center point used.

If all points of the seismic image has been used as a center point (test 303, output OK), it is possible to generate (step 309) a final image 310 that highlight the computed difference Diff for all the points of the seismic image or for points of a section of this seismic image. For instance, it is possible to associate a color scale or a color component for each possible plane used and stored in the database 305db (a red component for the plane comprising the axis $\vec{z}$ and $\vec{x}$; a blue component for the plane comprising the axis $\vec{z}$ and $\vec{y}$; etc.). Any color scale or any component system may be used. Thus, it is possible to stress, on the final image faults on different colors, i.e. based on the fault orientations. It is also possible to generate (step 309) a plurality of final images 310, each of the final images may stress fault in a given direction (i.e. direction of the selected plane).

Figure 4:
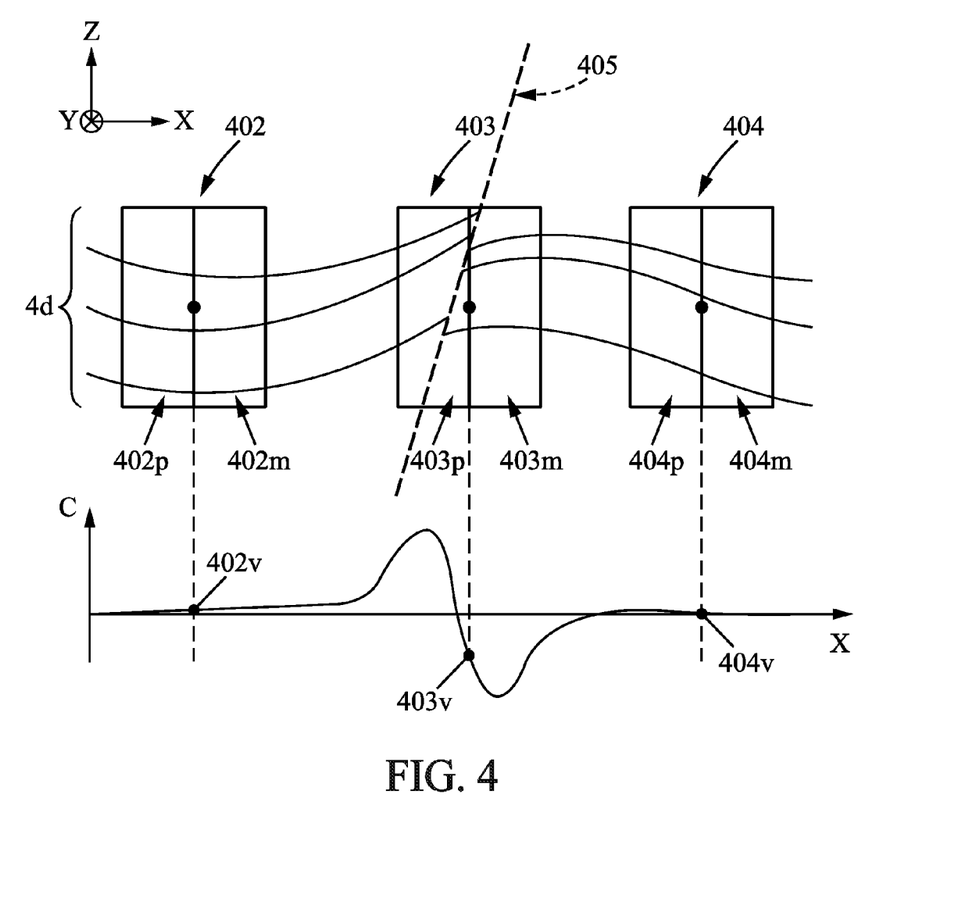
FIG. 4 is a representation of the computation of difference value associated with center points.

FIG. 4 is a representation of the computation of difference value associated with center points.

The lines 401 represent seismic horizon curves (e.g. vertical section of a 3D seismic image).

If the cube 402 is in a zone where no fault exists in the subsoil, the difference 402v computed as described above (i.e. difference of the sum of maximal correlation values for vertical lines in the zone 402p and the sum of maximal correlation values for vertical lines in the zone 402m) is close to 0.

Same consideration is made for cube 404 if no fault exists in the subsoil: the difference 404v is close to 0 as the sum of maximal correlation values for vertical lines in the zone 404p is very similar to the sum of maximal correlation values for vertical lines in the zone 404m.

If the cube 403 is in a zone where a fault 405 exists, three major cases may be encountered:
- if the fault is mainly is zone 403p, the computed difference may be positive;
- if the fault is mainly is zone 403m, the computed difference may be negative;
- if the fault is on the separation plane of zone 403p and zone 403m, the computed difference may be equal to 0.

This type of variation is very easy to detect for the human eye.

The test 303 and the step 304 may be inverted with the test 305 without any substantial modifications.

Figure 5:
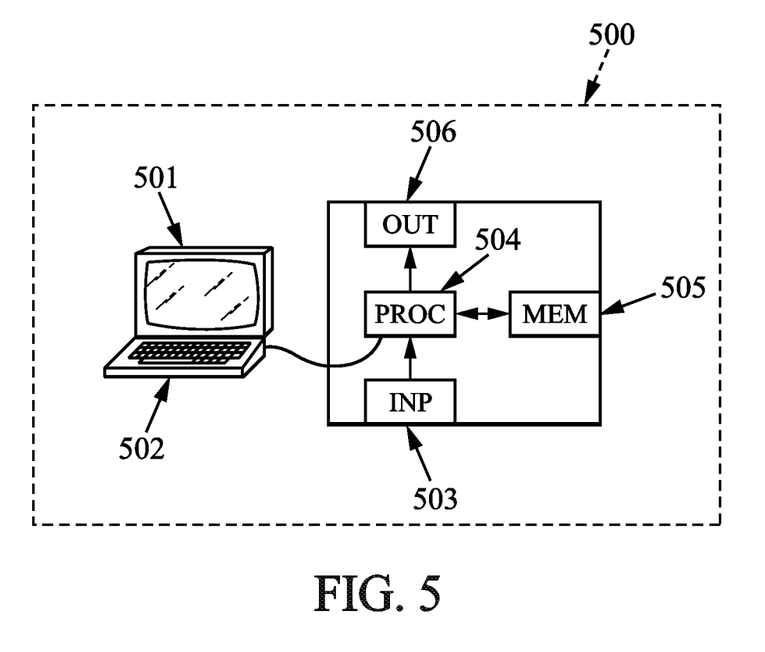
FIG. 5 is an embodiment for a device that enables the present invention.

FIG. 5 is an embodiment for a device that enables the present invention.

In this embodiment, the device 500 comprise a computer, this computer comprising a memory 505 to store program instructions loadable into a circuit and adapted to cause circuit 504 to carry out the steps of the present invention when the program instructions are run by the circuit 504.

The memory 505 may also store data and useful information for carrying the steps of the present invention as described above.

The circuit 504 may be for instance:
- a processor or a processing unit adapted to interpret instructions in a computer language, the processor or the processing unit may comprise, may be associated with or be attached to a memory comprising the instructions, or
- the association of a processor/processing unit and a memory, the processor or the processing unit adapted to interpret instructions in a computer language, the memory comprising said instructions, or
- an electronic card wherein the steps of the invention are described within silicon, or
- a programmable electronic chip such as a FPGA chip (for <<Field-Programmable Gate Array>>).

This computer comprises an input interface 503 for the reception of data used for the above method according to the invention and an output interface 506 for providing a representation of a correlation difference computed thanks to the seismic image.

To ease the interaction with the computer, a screen 501 and a keyboard 502 may be provided and connected to the computer circuit 504.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

A person skilled in the art will readily appreciate that various parameters disclosed in the description may be modified and that various embodiments disclosed may be combined without departing from the scope of the invention.

For instance, the embodiment describes neighbor points as a cube but any shapes may be used instead.

The invention claimed is:

1. A method to process a three dimensional seismic image, the seismic image comprising points, each point comprising an associated seismic value, wherein the method comprises:
/a/ receiving the three dimensional seismic image;
/b/ receiving a predetermined distance;
wherein, for a center point in the points of the seismic image and for a plane comprising said center point, said plane defining a first connected set of points, and a second connected set of points, the method further comprises:
/c/ determining a first maximal correlation between:
a first vector of the seismic values associated with at least a point of the seismic image having a distance to the center point below the predetermined distance and on a first line, said plane comprising said first line, and
a second vector of the seismic values associated with points on a second line parallel to the first line, the second vector being shifted by a plurality of shifting distances;
/d/ determining a second maximal correlation between:
the first vector, and
a third vector of the seismic values associated with points on a third line parallel to the first line, the third vector being shifted by a plurality of shifting distances;
/e/ determining a difference value based on at least a difference between the first maximal correlation and the second maximal correlation;
wherein the points of the first connected set of points are points of the seismic image having a distance to the center point below the predetermined distance, the points of the first connected set of points being on a first side of the plane;
wherein the points of the second connected set are points of the seismic image having a distance to the center point below the predetermined distance, the points of the second connected set of points being on a second side of the plane distinct from the first side.

2. The method according to claim 1, wherein step /c/ and /d/ are reiterated for a plurality of distinct second and third vector and the determination of step /e/ is based on the difference between sum of the first maximal correlations determined and a sum of the second maximal correlations determined.

3. The method according to claim 1, wherein, for the center point in the points of the seismic image, step /c/ and /d/ are reiterated for a plurality of different planes comprising said center point.

4. The method according to claim 3, wherein for the center point in the points of the seismic image, step /c/ and /d/ are reiterated for at least four distinct planes comprising said center point and a shared line, each plane in the four planes are perpendicular to a different plane in the four planes.

5. The method according to claim 1, wherein step /c/, /d/ and /e/ are reiterated for a plurality of distinct center points.

6. The method according to claim 5, wherein the method further comprises:
/f/ determining a representation of the seismic image, wherein a representation color for a current point in the plurality of center points is based on the value of the determined difference associated with said current point.

7. The method according to claim 3, wherein the method further comprises:
/f/ determining a representation of the seismic image, wherein each different plane is associated with a different color scale, a representation color of a determined difference is based on a color scale associated with the plane for which the difference is determined and the value of said determined difference associated with said current point.

8. The method according to claim 1, wherein points of the plane are excluded from points of the first connected set and/or the second connected set.

9. The method according to claim 1, wherein the second vector and/or the third vector is shifted by a plurality of shifting distances into a predetermined shifting interval.

10. The method according to claim 1, wherein the first line comprises the center point.

11. The method according to claim 1, wherein the first line comprises an orthogonal projection point of a point of the second line on the plane.

12. A non-transitory computer readable storage medium, having stored thereon a computer program comprising program instructions, the computer program being loadable into a data-processing unit and adapted to cause the data-processing unit to carry out the steps of claim 1 when the computer program is run by the data-processing device.

13. A device to process a three dimensional seismic image, the seismic image comprising points, each point comprising an associated seismic value, wherein the device comprises:
/a/ an interface for receiving the three dimensional seismic image;
/b/ an interface for receiving a predetermined distance;
wherein, for a center point in the points of the seismic image and for a plane comprising said center point, said plane defining a first connected set of points, and a second connected set of points, the device further comprises:
/c/ a circuit for determining a first maximal correlation between:
a first vector of the seismic values associated with points of the seismic image having a distance to the center point below the predetermined distance and on a first line, said plane comprising said first line, and
a second vector of the seismic values associated with points on a second line parallel to the first line, the second vector being shifted by a plurality of shifting distances into an predetermined shifting interval;
/d/ a circuit for determining a second maximal correlation between:
the first vector, and
a third vector of the seismic values associated with points on a third line parallel to the first line, the third vector being shifted by a plurality of shifting distances;
/e/ a circuit for determining a difference value based on at least a difference between the first maximal correlation and the second maximal correlation;
wherein the points of the first connected set of points are the points of the seismic image having a distance to the center point below the predetermined distance, the points of the first connected set of points being on a first side of the plane;
wherein the points of the second connected set of points are the points of the seismic image having a distance to the center point below the predetermined distance, the points of the second connected set of points being on a second side of the plane distinct from the first side.

* * * * *